(12) United States Patent
Togashi

(10) Patent No.: US 9,053,864 B2
(45) Date of Patent: Jun. 9, 2015

(54) MULTILAYER CAPACITOR AND METHOD FOR MANUFACTURING THE SAME

(75) Inventor: Masaaki Togashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 129 days.

(21) Appl. No.: 13/476,485

(22) Filed: May 21, 2012

(65) Prior Publication Data

US 2012/0300361 A1 Nov. 29, 2012

(30) Foreign Application Priority Data

May 25, 2011 (JP) ................. 2011-117355

(51) Int. Cl.
- *H01G 4/30* (2006.01)
- *H01G 4/228* (2006.01)
- *H01G 4/12* (2006.01)
- *H01G 4/232* (2006.01)

(52) U.S. Cl.
CPC . *H01G 4/12* (2013.01); *H01G 4/30* (2013.01); *H01G 4/232* (2013.01)

(58) Field of Classification Search
USPC ............... 361/301.4, 303, 311, 308.1, 306.2, 361/306.1; 29/25.42
See application file for complete search history.

(56) References Cited

U.S. PATENT DOCUMENTS

| | | | |
|---|---|---|---|
| 6,310,757 B1 * | 10/2001 | Tuzuki et al. | 361/308.1 |
| 2008/0305944 A1 * | 12/2008 | Ueda et al. | 501/137 |
| 2009/0002920 A1 * | 1/2009 | Itamura et al. | 361/321.3 |

FOREIGN PATENT DOCUMENTS

| | | | |
|---|---|---|---|
| JP | 05003134 A | * | 1/1993 |
| JP | A-6-215978 | | 8/1994 |
| JP | 7-45469 | † | 2/1995 |
| JP | 11-340106 | † | 12/1999 |
| JP | A-2003-100548 | | 4/2003 |
| JP | A-2003-257779 | | 9/2003 |
| JP | A-2006-202857 | | 8/2006 |

\* cited by examiner
† cited by third party

*Primary Examiner* — Eric Thomas
(74) *Attorney, Agent, or Firm* — Oliff PLC

(57) ABSTRACT

In a multilayer capacitor, a first dielectric layered product including a first body principal face is formed to be thicker than a second dielectric layered product including a second body principal face in a stacking direction thereof. A first external electrode and a second external electrode extend only to the first body principal face from a first body end face and a second body end face. Alternatively, the first external electrode and the second external electrode extend at least to the first body principal face from the first body end face and the second body end face and extend also to at least one of the second body principal face, a first body lateral face, and a second body lateral face.

16 Claims, 7 Drawing Sheets

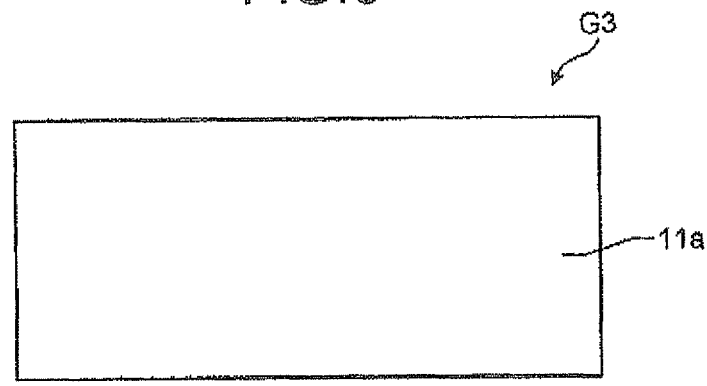
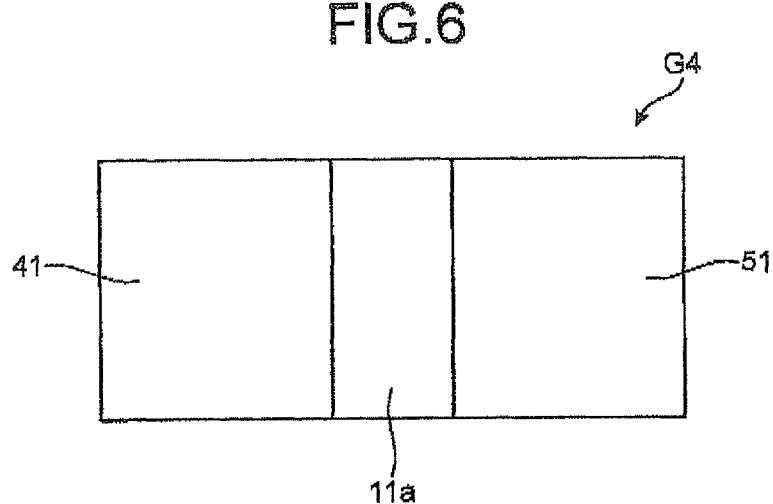

ND METHOD
MULTILAYER CAPACITOR AND METHOD FOR MANUFACTURING THE SAME

CROSS-REFERENCE TO RELATED APPLICATIONS

This application is based upon and claims the benefit of priority from Japanese Patent Application No. 2011-117355, filed May 25, 2011, the entire contents of which are incorporated herein by reference.

BACKGROUND OF THE INVENTION

1. Field of the Invention

The present invention relates to a multilayer capacitor to be mounted on a circuit board and a method for manufacturing the multilayer capacitor.

2. Description of the Related Art

An electronic device such as a personal computer, a PDA (personal digital assistant), or a mobile phone includes a circuit board on which a capacitor, an inductor, a varistor, or a composite component in combination thereof is surface-mounted. With such a structure, the entire circuit board in the electronic device is downsized by densely mounting electronic components thereon. Examples of the capacitor to be mounted on the circuit board may include a ceramic capacitor. Examples of the ceramic capacitor may include a multilayer capacitor in which a dielectric and an internal electrode are stacked in an alternate manner.

In a case where a ceramic multilayer capacitor is directly mounted on a circuit board and a force or a heat is then applied to the circuit board itself, there is a risk that a mechanical stress due to the deformation of the circuit board or a heat stress (external stress) is applied to the multilayer capacitor to cause a crack and thereby influence internal electrodes thereof. In order to prevent such a crack, there has been suggested an electronic component in which a multilayer capacitor and a circuit board are mounted via a pair of metal terminals attached so as to interpose the multilayer capacitor therebetween (a document D1: Japanese Patent Application Laid-Open No. 2003-257779, for example).

Although the metal terminals described in the document D1 have an effect of suppressing cracks, a multilayer capacitor in recent years has been desired to suppress cracks more easily.

SUMMARY OF THE INVENTION

According to a first aspect of the present invention, there is provided a multilayer capacitor comprising: a dielectric body; and a first external electrode and a second external electrode formed on the dielectric body, the dielectric body including: an internal electrode layered product in which a first internal electrode and a second internal electrode being opposite to each other are stacked via a dielectric therebetween; a first dielectric layered product and a second dielectric layered product interposing the internal electrode layered product from both sides thereof in a stacking direction; a first body principal face and a second body principal face being opposite to each other in the stacking direction; a first body lateral face and a second body lateral face being opposite to each other and connecting between the first body principal face and the second body principal face; and a first body end face and a second body end face from which the first internal electrode and the second internal electrode are extracted in respectively opposite directions, wherein the first dielectric layered product including the first body principal face is formed to be thicker than the second dielectric layered product including the second body principal face in the stacking direction and wherein the first external electrode and the second external electrode are formed at least on the first body end face and the second body end face and connected to the first internal electrode and the second internal electrode, respectively and extend only to the first body principal face from the first body end face and the second body end face, or the first external electrode and the second external electrode extend at least to the first body principal face from the first body end face and the second body end face and extend also to at least one of the second body principal face, the first body lateral face, and the second body lateral face, and a dimension of portions of the first internal electrode and the second internal electrode extended to the first body principal face in the extracting directions is larger than that of the portions extended to at least one of the second body principal face, the first body lateral face, and the second body lateral face.

According to a second aspect of the present invention, there is provided a multilayer capacitor comprising: a dielectric body; and a first external electrode and a second external electrode formed on the dielectric body, the dielectric body including: an internal electrode layered product in which a first internal electrode and a second internal electrode being opposite to each other are stacked via a dielectric therebetween; a first dielectric layered product and a second dielectric layered product interposing the internal electrode layered product from both sides thereof in a stacking direction; a first body principal face and a second body principal face opposite to each other in the stacking direction; a first body lateral face and a second body lateral face opposite to each other and connecting between the first body principal face and the second body principal face; and a first body end face and a second body end face from which the first internal electrode and the second internal electrode are extracted in respectively opposite directions, wherein the first dielectric layered product including the first body principal face is formed to be thicker than the second dielectric layered product including the second body principal face in the stacking direction, wherein the first external electrode and the second external electrode are formed at least on the first body end face and the second body end face and connected to the first internal electrode and the second internal electrode, respectively, wherein the first external electrode and the second external electrode include: a first external electrode extended portion and a second external electrode extended portion extended to the first body principal face from the first body end face and the second body end face, respectively; and a first conductive portion and a second conductive portion that are conductors extended to the first body principal face in the extracting directions of the first internal electrode and the second internal electrode respectively from the first body end face and the second body end face, and wherein the first external electrode extended portion and the second external electrode extended portion are connected to the first conductive portion and the second conductive portion while being overlapped with respective portions of the first conductive portion and the second conductive portion.

According to a third aspect of the present invention, there is provided a method for manufacturing a multilayer capacitor, comprising: interposing an internal electrode layered product in which a first internal electrode and a second internal electrode opposite to each other are stacked via a dielectric between a first dielectric layered product and a second dielectric layered product from both sides thereof in a stacking direction and forming a dielectric body in such a manner that the first dielectric layered product is thicker than the second dielectric layered product in the stacking direction; and first forming a first external electrode and a second external electrode respectively extended from a first body end face and a second body end face from which the first internal electrode and the second internal electrode are extracted in respectively apposite directions to portions of a first body principal face that is a surface of the first dielectric layered product in the stacking direction and connects between the first body end face and the second body end face.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram for explaining an example of a ceramic green sheet of the multilayer capacitor according to the embodiment of the present invention.

FIG. 6 is a diagram for explaining an example of a ceramic green sheet of the multilayer capacitor according to the embodiment of the present invention.

DETAILED DESCRIPTION OF THE PREFERRED EMBODIMENTS

Embodiments of the present invention will be described in detail with reference to drawings. It is to be understood that the present invention is not limited by the contents described in the following embodiments. Moreover, components to be described below include those easily envisioned by those skilled in the art and those substantially the same. Furthermore, the components to be described below can be appropriately combined with one another.

The embodiments of the present invention aim to provide a multilayer capacitor capable of suppressing cracks and a method for manufacturing the multilayer capacitor.

(First Embodiment)

Figure 1:
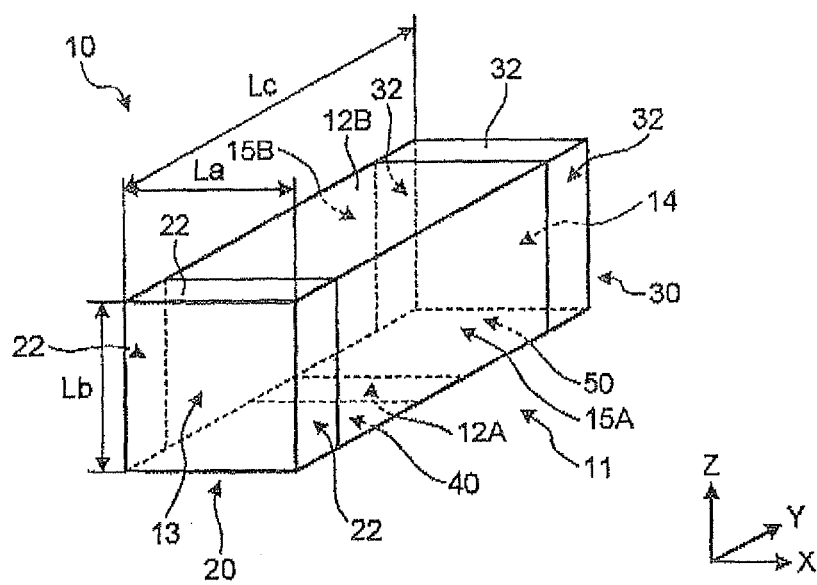
FIG. 1 is a perspective view showing a multilayer capacitor according to an embodiment of the present invention.
Figure 2:
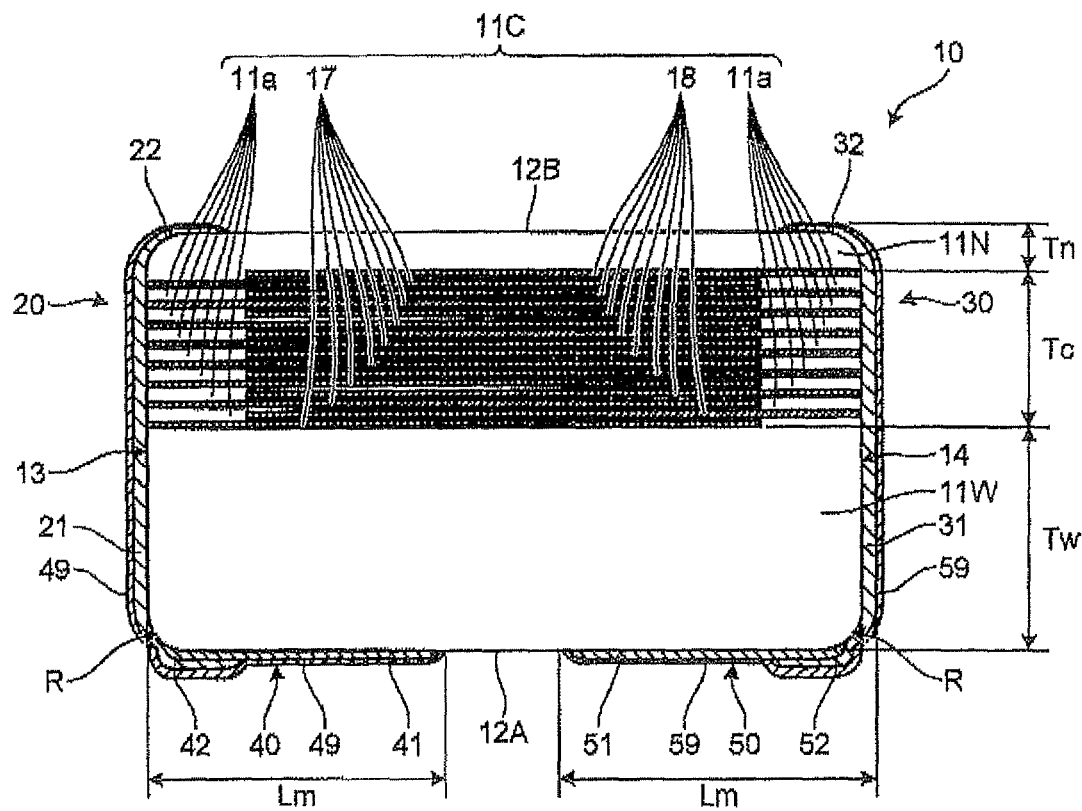
FIG. 2 is a cross-sectional view showing the multilayer capacitor according to the embodiment of the present invention.

FIG. 1 is a perspective view showing a multilayer capacitor according to the present embodiment. FIG. 2 is a cross-sectional view showing the multilayer capacitor according to the present embodiment. FIG. 2 shows a cross-section of a multilayer capacitor 10 according to the present embodiment cut along a plane perpendicular to external electrode end face portions 21 and 31 of external electrodes 20 and 30 and internal electrodes 17 and 18. The multilayer capacitor 10 is a multilayer ceramic capacitor. The multilayer capacitor 10 includes a dielectric body 11, and the first external electrode 20 and the second external electrode 30 formed at end faces of the dielectric body 11. The multilayer capacitor 10 has a generally rectangular solid shape. Due to such a structure, the multilayer capacitor 10 includes a first body principal face 12A and a second body principal face 12B of the dielectric body 11 in a direction of stacking the internal electrodes 17 and 18 shown in FIG. 2 (stacking direction). The first body principal face 12A and the second body principal face 12B face each other. Moreover, the multilayer capacitor 10 includes a first body lateral face 15A and a second body lateral face 15B facing each other, and a first body end face 13 and a second body end face 14 facing each other. The first body lateral face 15A and the second body lateral face 15B connect between the first body principal face 12A and the second body principal face 12B. The internal electrodes 17 and 18 are respectively extracted from the first body end face 13 and the second body end face 14 in respectively-opposite directions, and the first and second external electrodes 20 and 30 are formed at the first body end face 13 and the second body end face 14, respectively. The external electrodes 20 and 30 respectively cover the entire opposite end faces of the dielectric body 11 having a generally rectangular solid shape.

The external electrodes 20 and 30 at least cover the body end faces 13 and 14 which are the end faces of the dielectric body 11. Thus, as shown in FIG. 2, the external electrodes 20 and 30 include the external electrode end face portions 21 and 31. Furthermore, the external electrodes 20 and 30 may include external electrode extended portions 22 and 32 extended from the external electrode end face portions 21 and 31 to at least one of the second body principal face 12B and the first and second body lateral faces 15A and 15B.

The multilayer capacitor 10 is provided with a first external electrode extended portion 40 and a second external electrode extended portion 50 which are respectively connected to the external electrodes 20 and 30 and formed so as to be extended to the first body principal face 12A. The external electrodes 20 and 30 have L-shaped terminals formed only by the external electrode end face portions 21 and 31 and the external electrode extended portions 40 and 50. Alternatively, the external electrodes 20 and 30 have the external electrode end face portions 21 and 31, the external electrode extended portions 40 and 50, and the external electrode extended portions 22 and 32. In such a case, the external electrode extended portions 40 and 50 are formed longer than the other external electrode extended portions 22 and 32 respectively connected to the external electrodes 20 and 30 in the extracting directions of the internal electrodes 17 and 18. Note that the external electrode extended portions 22 and 32 extend to at least one of the second body principal face 12B, the first body lateral face 15A, and the second body lateral face 15B.

In the multilayer capacitor 10, the first external electrode extended portion 40 and the second external electrode extended portion 50 each extended to the first body principal face 12A serve as bottom electrodes to be connected to a circuit board to be described later with a solder or the like. Since the multilayer capacitor 10 has long bottom electrodes, an external stress from the circuit board is reduced as compared with a case where the bottom electrodes are short even when the deflection amount of the circuit board is the same for both cases. Thus, it is possible to suppress the risk of generating a crack in the multilayer capacitor. Moreover, since a portion other than the bottom electrodes is short in the multilayer capacitor 10, the entire external electrode area is reduced. Therefore, it is possible to reduce stress cracks due to electrode layers (baked layers, plated layers). Furthermore, since the multilayer capacitor 10 has the long bottom electrodes, solder connection between the circuit board and the bottom electrodes can be ensured. As a result, the bonding strength between the multilayer capacitor 10 and the circuit board can be ensured.

In the present embodiment, a longitudinal direction of the dielectric body 11, i.e., a direction perpendicular to the body end faces 13 and 14 at which the pair of external electrodes 20 and 30 are formed is referred to as a Y-axis, and axes perpendicular to the Y-axis are referred to as an X-axis and a Z-axis, respectively. The body end faces 13 and 14 of the dielectric body 11 at which the external electrodes 20 and 30 are formed have a square shape or a rectangular shape.

A length of one side of the body end faces 13 and 14 is La in the X-axis direction and Lb in the I-axis direction. In the present embodiment, assuming that the body end faces 13 and 14 each have a square shape, for example, La=Lb. Alternatively, assuming that the body end faces 13 and 14 each have a rectangular shape, for example, La<Lb or La>Lb. A length of the dielectric body 11 in the Y-axis direction, i.e., a length of the dielectric body 11 in the longitudinal direction thereof is Lc. Lc is the shortest distance between the pair of body end faces 13 and 14.

The external electrodes 20 and 30 are made of a conductive material and electrically connected to the internal electrodes 17 and 18 of the dielectric body 11 as will be described later. The external electrodes 20 and 30 each have a structure in which copper (Cu), palladium (Pd) or a silver/palladium alloy (Ag/Pd), nickel (Ni), and tin (Sn) are stacked in this order, for example. Note that each of the external electrodes 20 and 30 may be formed by a plurality of metal electrode layers. In the external electrodes 20 and 30 of the present embodiment, plated layers 49 and 59 such as Ni plating or Sn plating are formed on underlying external electrode layers whose main component is copper (Cu).

The dielectric body 11 has a rectangular shape in a planar view (a state as viewed from the Z-axis direction or from the X-axis direction). In a planar view, the dielectric body 11 has a longitudinal direction (Y-axis direction) and a lateral direction (X-axis direction or Z-axis direction). Next, an internal configuration of the dielectric body 11 will be described briefly.

As shown in FIG. 2, the dielectric body 11 includes the internal electrodes 17 and 18 and dielectrics 11$a$ made of a dielectric material. For example, the internal electrodes 17 and 18 are made of palladium, a silver/palladium alloy, nickel, copper (Cu), or the like. The dielectric 11$a$ is barium titanate ($BaTiO_3$) or the like, for example. In the present embodiment, the dielectric body 11 includes an internal electrode layered product 11C in which the dielectrics 11$a$ and the internal electrodes 17 and 18 are stacked alternately.

The dielectric body 11 includes a first dielectric layered product 11W and a second dielectric layered product 11N interposing the internal electrode layered product 11C from both sides thereof in the stacking direction. A thickness Tw of the first dielectric layered product 11W (a dimension of the dielectric layered product 11W in the stacking direction) is formed to be larger than a thickness Tn of the second dielectric layered product 11N (a dimension of the dielectric layered product 11N in the stacking direction). A ratio Tn/Tw between the thickness Tn of the dielectric layered product 11N in the stacking direction and the thickness Tw of the dielectric layered product 11W in the stacking direction is preferably in a range of 0.05 or larger and 0.15 or smaller. Moreover, a ratio Tc/Tw between Tc and Tw is preferably in a range of 0.40 or larger and 0.80 or smaller.

The first body principal face 12A is formed in the dielectric layered product 11W, and the second body principal face 12B is formed in the dielectric layered product 11N. Conductive portions 41 and 51, which are electrically isolated from each other, are formed with a conductive material on the first body principal face 12A. The conductive portions 41 and 51 are formed so as to be extended from the body end faces 13 and 14 by a distance equal to Lm, respectively. Lm is preferably set so that Lm/Lc, which is a ratio with the length Lc of the dielectric body 11 in the longitudinal direction thereof, is in a range of 0.15 or larger and 0.4 or smaller. If Lm/Lc falls within this range, short circuit between the conductive portions 41 and 51 can be suppressed while setting the conductive portions 41 and 51 to be longer than the external electrode extended portions 22 and 32. The external electrodes 20 and 30 include external electrode extended portions 42 and 52 extended to the first body principal face 12A. The external electrode extended portions 42 and 52 overlap with portions of the conductive portions 41 and 51, resulting in electrical conduction between the external electrodes 20 and 30 and the conductive portions 41 and 51.

The external electrode extended portions 40 and 50 shown in FIG. 1 include the conductive portions 41 and 51 and the external electrode extended portions 42 and 52 as shown in FIG. 2. In the external electrode extended portions 40 and 50, the external electrode extended portions 42 and 52 are formed so as to overlap, in the stacking direction, with the conductive portions 41 and 51 on the first body end face 13 side and the second body end face 14 side. Curved portions R are often formed at ridge lines between the first body principal face 12A and the body end faces 13 and 14. With such a structure, it is possible to suppress an unintended chip at the ridge lines of the dielectric body 11.

The conductive portions 41 and 51 are formed so as to be extended to the first body end face 13 side and the second body end face 14 side. Thus, even if the curved portions R are enlarged due to barrel polishing or the like, the conductive portions 41 and 51 can increase the thickness of the curved portions R so as to reduce the radius of curvature for the curved portions R. Moreover, the covering of the curved portions R by the conductive portions 41 and 51 can reduce a variation in the dimension of the radius of curvature for the curved portions R. Furthermore, the reduced radius of curvature for the curved portions R can reduce a risk that the multilayer capacitor 10 is inverted when the multilayer capacitor 10 is mounted on the circuit board due to a surface tension of a melted solder present between the external electrode extended portions 40 and 50 and the circuit board. Moreover, since the conductive portions 41 and 51 are formed so as to reach the first body end face 13 and the second body end face 14, the external electrode extended portions 42 and 52 overlap in the stacking direction with the conductive portions 41 and 51 on the first body end face 13 side and the second body end face 14 side. With such a structure, reliability for electrical connection can be improved.

The conductive portions 41 and 51 are formed from palladium, a silver/palladium alloy, nickel (Ni), copper Cu), or the like, for example. The conductive portions 41 and 51 are preferably formed each by a baked layer obtained by the application of a conductive paste such as nickel (Ni) and the baking process thereof. Accordingly, it is possible to increase the bonding strength for the conductive portions 41 and 51 to be bonded to the dielectric 11a of the first body principal face 12A. The conductive portions 41 and 51 can be alternatively made of the same material as that of the internal electrodes 17 and 18. This makes it possible to burn a green layered product and bake the conductive portions 41 and 51 simultaneously, thereby making the shrinkage percentages for both about the same. Thus, deformation of the dielectric body 11 can be suppressed. As a result, a stress acting on the dielectric body 11 is reduced. Moreover, the bonding strength between the dielectric body 11 and the conductive portions 41 and 51 can be improved. Since palladium, a silver/palladium alloy, nickel (Ni), copper (Cu), or the like, is a metal relatively soft and easy to reduce a stress, the conductive portions 41 and 51 using such a metal can also protect the dielectric body 11, especially the ridge line portions described above.

Moreover, the conductive portions 41 and 51 more preferably contain ceramic powders. Barium titanate, which is the same material as the dielectric body 11, or the like can be used as ceramic powders. If the conductive portions 41 and 51 contain ceramic powders, adhesion between the dielectric body 11 and the conductive portions 41 and 51 is improved, thereby improving the bonding strength therebetween. Note that the external electrode end face portions 21 and 31 preferably contain less ceramic powders as compared to the conductive portions 41 and 51 or contain no ceramic powders. Accordingly, conductivity between the external electrode end face portions 21 and 31 and the internal electrodes 17 and 18 is improved.

The above-described plated layers 49 and 59 are preferably formed so as to cover the conductive portions 41 and 51 and the external electrode extended portions 42 and 52. Accordingly, reliable mounting to the circuit board becomes possible using a solder or the like. Owing to the overlapping between the conductive portions 41 and 51 and the external electrode extended portions 42 and 52, electrical connection between the conductive portions 41 and 51 and the external electrode end face portions 21 and 31 is ensured. As a result, in electrolytic plating, current is reliably applied to the external electrode end face portions 21 and 31, the external electrode extended portions 42 and 52, and the conductive portions 41 and 51. Thus, the plated layers 49 and 59 can be formed reliably and uniformly on the surfaces thereof. In the present embodiment, the external electrode extended portions 40 and 50 thus include the conductive portions 41 and 51, the external electrode extended portions 42 and 52, and the plated layers 49 and 59.

In the multilayer capacitor 10, the first dielectric layered product 11W including the first body principal face 12A is formed to be thicker than the second dielectric layered product 11N including the second body principal face 12B in the stacking direction thereof. Moreover, in the multilayer capacitor 10, the first and second conductive portions 41 and 51 are formed on the first body principal face 12A by conductors extended in the extracting directions of the internal electrodes 17 and 18 from the first body end face 13 side and the second body end face 14 side, respectively. In the multilayer capacitor 10, the external electrode extended portions 42 and 52 of the first external electrode 20 and the second external electrode 30 are connected to the first conductive portion 41 and the second conductive portion 51 while overlapping with the respective portions of the conductive portions 41 and 51.

With such a structure, the first external electrode extended portion 40 and the second external electrode extended portion 50 and the first conductive portion 41 and the second conductive portion 51 serve as bottom electrodes extended in the extracting directions of the internal electrodes 17 and 18. Since the bottom electrodes are long, an external stress from the circuit board is reduced as compared with a case where the bottom electrodes are short even when the deflection amount of the circuit board is the same for both cases. Thus, it is possible to suppress the risk of generating a crack in the multilayer capacitor 10. Since an extended portion other than the bottom electrodes is absent or short, the entire external electrode area is reduced. Therefore, it is possible to reduce stress cracks due to electrode layers (baked layers, plated layers). Moreover, since the bottom electrodes are long, solder connection with the circuit board can be ensured. As a result, the bonding strength between the multilayer capacitor and the circuit board can be ensured. Next, a method for manufacturing the multilayer capacitor according to the present embodiment will be described.

Figure 7:
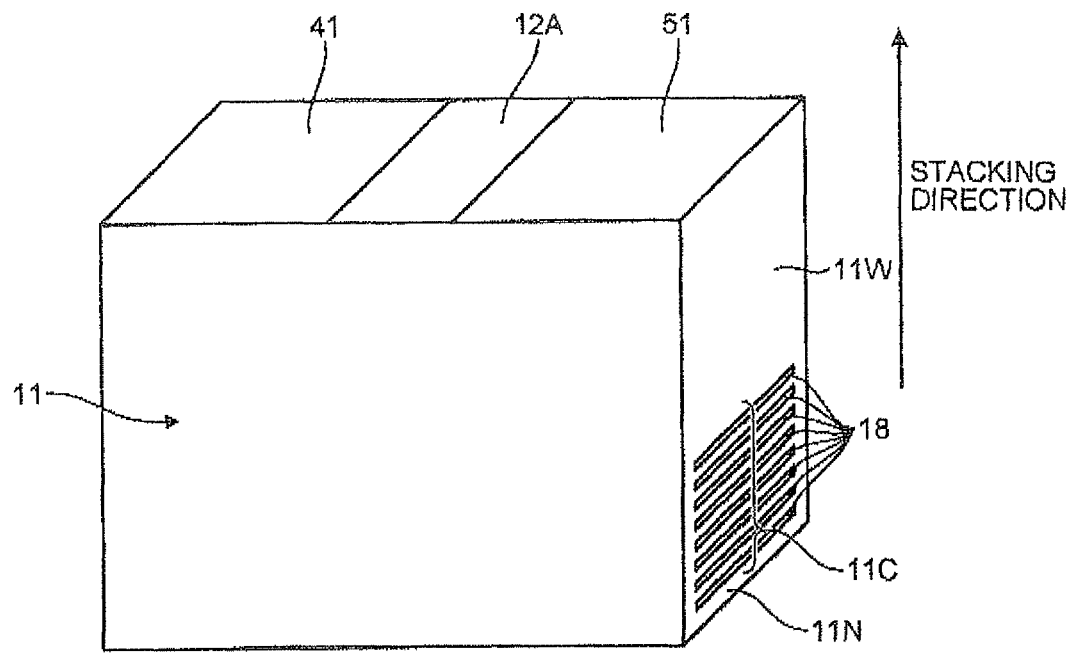
FIG. 7 is a diagram for explaining an example of stacking in a dielectric body of the multilayer capacitor according to the embodiment of the present invention.

FIGS. 3, 4, 5, and 6 are diagrams each for explaining an example of a ceramic green sheet in the multilayer capacitor according to the present embodiment. FIG. 7 is a diagram for explaining an example of stacking in the dielectric body of the multilayer capacitor according to the present embodiment. According to the multilayer capacitor manufacturing method of the present embodiment, the dielectric body 11 is prepared first. The dielectric body 11 is a sintered body with a shape of a rectangular solid obtained by subjecting a layered product including a plurality of stacked ceramic green sheets (unburnt ceramic sheets) to thermocompression bonding for unification, cutting, defatting, and burning.

Figure 3:
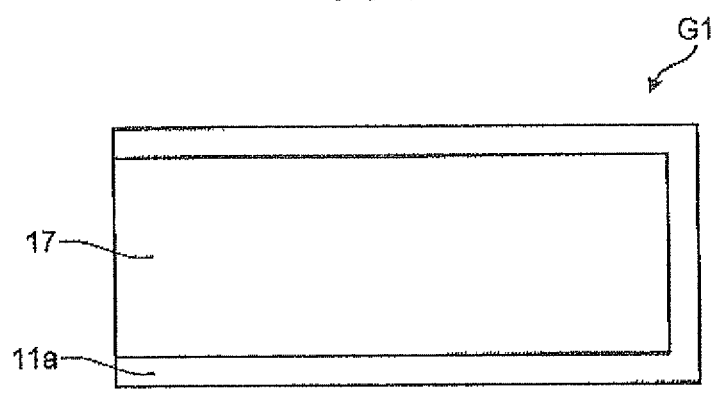
FIG. 3 is a diagram for explaining an example of a ceramic green sheet of the multilayer capacitor according to the embodiment of the present invention.
Figure 4:
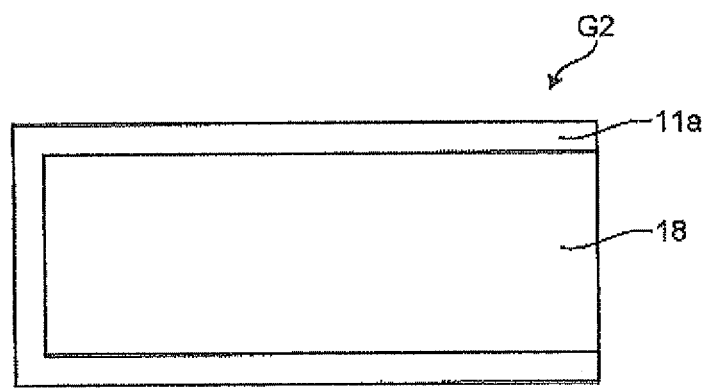
FIG. 4 is a diagram for explaining an example of a ceramic green sheet of the multilayer capacitor according to the embodiment of the present invention.

As shown in FIGS. 3 and 4, in ceramic green sheets G1 and G2, respective patterns of the internal electrode 17 and the internal electrode 18 are formed on the unburnt dielectrics 11a using a conductive paste such as nickel (Ni), or example.

As shown in FIG. 5, a ceramic green sheet G3 is formed by the unburnt dielectric 11a. Moreover, as shown in FIG. 6, in a ceramic green sheet G4, respective patterns of the conductive portions 41 and 51 are formed on the unburnt dielectric 11a using a conductive paste such as nickel (Ni), for example. The patterns of the conductive portions 41 and 51 are preferably formed using the same material as that of the internal electrodes 17 and 18. Then, by simultaneously performing the burning of the green layered product containing the internal electrodes 17 and 18 and the baking of the conductive portions 41 and 51, shrinkage percentages thereof are made approximately the same. Thus, deformation of the dielectric body 11 is suppressed. As a result, a stress acting on the dielectric body 11 is reduced. Moreover, the bonding strength between the dielectric body 11 and the conductive portions 41 and 51 can be improved. Note that the conductive paste more preferably contains ceramic powders. Accordingly, the bonding strength between the dielectric body 11 and the conductive portions 41 and 51 can be improved.

Upon the preparation of the dielectric body 11, a dielectric body forming step of forming the dielectric body 11 is performed. In the dielectric body forming step, a plurality of ceramic green sheets G3 shown in FIG. 5 are staked, for example, to stack the dielectric layered product 11N shown in FIG. 7. Next, a plurality of ceramic green sheets G1 and G2 shown in FIGS. 3 and 4 are alternately stacked to stack the internal electrode layered product 11C shown in FIG. 7. Next, a plurality of ceramic green sheets G3 shown in FIG. 5 are stacked to further stack the dielectric layered product 11W shown in FIG. 7. The dielectric layered product 11W is formed thicker than the dielectric layered product 11N by containing more ceramic green sheets G3 than the dielectric layered product 11N.

Next, performed is a conductive portion forming step of forming the conductive portions 41 and 51, which are electrically isolated from each other, on a dielectric body surface of the dielectric layered product 11W in the stacking direction. For example, the ceramic green sheet G4 shown in FIG. 6 is stacked on the uppermost ceramic green sheet G3 of the dielectric layered product 11W, thereby exposing the conductive portions 41 and 51 on the surface of the dielectric body 11.

Figure 8:
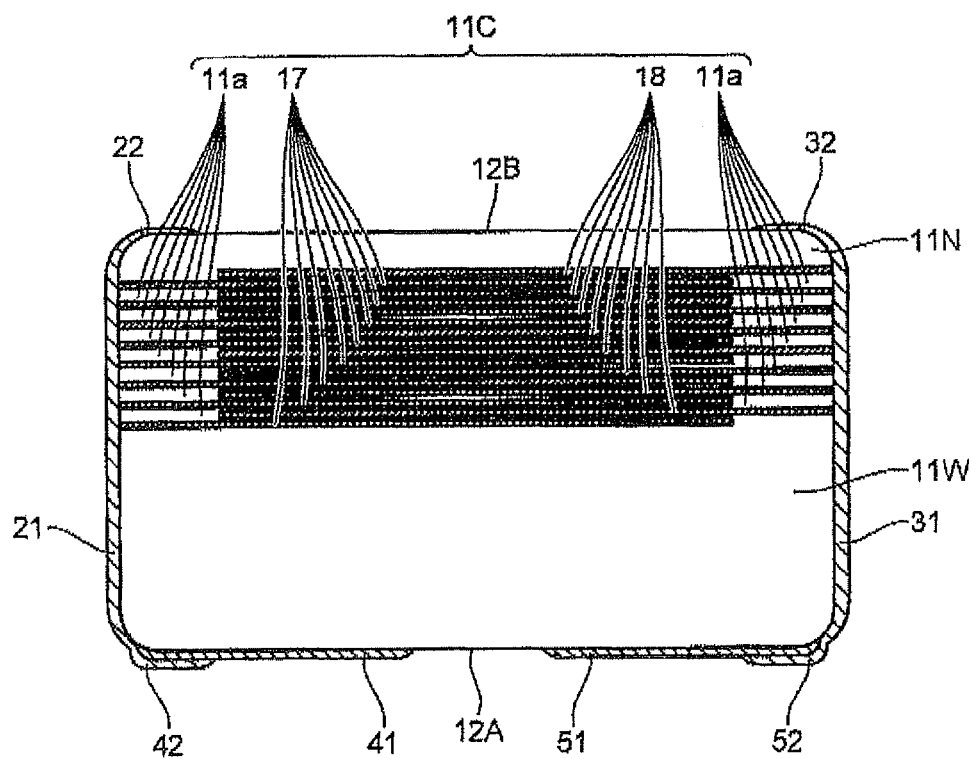
FIG. 8 is a diagram for explaining an example of external electrodes of the multilayer capacitor according to the embodiment of the present invention.

Next, a burning step of burning the dielectric body 11 shown in FIG. 8 is performed. According to the present embodiment, the burning of the green layered product including the internal electrodes 17 and 18 and the baking of the conductive portions 41 and 51 are simultaneously performed, thereby being able to reduce the number of manufacturing steps. Note that the conductive portions 41 and 51 may be formed using a printing method or the like after the burning of the green layered product, and may be then subjected to a baking process.

A conductive portion forming step of forming the conductive portions 41 and 51, which are electrically isolated from each other, on a dielectric body surface of the dielectric layered product 11W in a direction perpendicular to the stacking direction is performed. Accordingly, the conductive portions 41 and 51 can be formed from a conductive paste containing nickel, copper, silver, or the like, using a printing method such as screen printing, or the like.

The dielectric body 11 is provided with the curved portions R shown in FIG. 2 with barrel polishing in order to prevent an unintended chip at the ridge lines. If the curved portions R are large, the multilayer capacitor 10 may be possibly inverted due to a surface tension of a melted solder present between the circuit board and the external electrodes of the multilayer capacitor 10 when the multilayer capacitor 10 is mounted on the circuit board. According to the multilayer capacitor manufacturing method of the present embodiment, the conductive portions 41 and 51 can protect the surface of the dielectric body 11 during the barrel polishing. As a result, polishing of the surface of the dielectric body 11 on which the conductive portions 41 and 51 are formed is suppressed, thereby being able to suppress enlargement of the curved portions R formed at the ridge lines between the surface of the dielectric body 11 on which the conductive portions 41 and 51 are formed and the surface of the dielectric body 11 on which no conductive portions 41 and 51 are formed. If the conductive portions 41 and 51 are present during the barrel polishing as described above, an increase in the radius of curvature for the curved portions R in the multilayer capacitor 10 to be manufactured is suppressed, thereby reducing the risk that the multilayer capacitor 10 is inverted during the mounting thereof.

Next, an external electrode forming step of forming the external electrodes 20 and 30 on the dielectric body 11 is performed. As a result, electrical conduction between the external electrode end face portions 21 and 31 and the internal electrodes 17 and 18 is achieved. The external electrode end face portions 21 and 31 of the external electrodes 20 and 30 are formed at least on the body end faces 13 and 14, for example, by dipping the body end faces 13 and 14 of the dielectric body 11 into a conductive paste, or using a transfer method, a printing method, or the like. Moreover, the external electrode extended portions 42 and 52 extended from the external electrode end face portions 21 and 31 to the first body principal face 12A are formed on the first body principal face 12A. Thereafter, a heat treatment is performed thereto to form the external electrodes to be baked layers.

Note that the external electrode extended portions 22 and 32 extended from the external electrode end face portions 21 and 31 may be formed on the body principal face 12B or either the body lateral face 15A or 15S. The external electrode extended portions 42 and 52 and the external electrode extended portions 22 and 32 may be formed by making a conductive paste run over from the external electrode end face portions 21 and 31, or may be formed by repeating a printing method a plurality of times.

The external electrode extended portions 42 and 52 overlap with portions of the conductive portions 41 and 51 to obtain electrical conduction therebetween. Thus, the conductive portions 41 and 51 and the external electrode extended portions 42 and 52 together form the external electrode extended portions 40 and 50. By forming the external electrodes with two steps, it is possible to easily elongate the external electrode extended portions 42 and 52 to be the bottom electrodes. Moreover, by forming the external electrodes with two steps, it is possible to easily manufacture the multilayer capacitor having the bottom electrodes longer than the other electrodes.

The length of the external electrode extended portions 42 and 52 may be a length just enough to overlap with portions of the conductive portions 41 and 51. As a result, the length of the external electrode extended portions 42 and 52 can be reduced, thereby eliminating the need to apply a large amount of conductive paste to the external electrode end face portions 21 and 31. As a result, in the external electrode forming step, an amount of conductive paste to form the external electrodes 20 and 30 can be reduced. Moreover, since the amount of conductive paste to form the external electrodes 20 and 30 is reduced, the thickness of the external electrode end face portions 21 and 31 of the external electrodes 20 and 30 can be prevented from increasing. As a result, stress cracks caused by the external electrodes 20 and 30 are reduced.

Next, a plating step of plating the outer surfaces of the external electrodes 20 and 30 is performed. The overlapping between the conductive portions 41 and 51 and the external electrode extended portions 42 and 52 ensures electrical connection therebetween. As a result, electroplating conduction is reliably made all the way up to the conductive portions 41 and 51, and it is therefore possible to make uniform the plated layers 49 and 59 formed on the surfaces of the external electrode extended portions 42 and 52 and the conductive portions 41 and 51.

For example, the plating is nickel (Ni) or copper (Cu) plating. Nickel (Ni) plating can be performed using nickel (Ni) plating bath such as Watts bath. Moreover, tin (Sn) plating is performed on the surface of a nickel (Ni) layer formed by the nickel (Ni) plating. For example, tin (Sn) plating can be performed with a barrel plating method using neutral tin (Sn) plating bath, or the like. Then, the plated layers 49 and 59 shown in FIG. 1 are formed so as to cover the conductive portions 41 and 51 and the external electrode extended portions 42 and 52.

According to the above-described multilayer Capacitor manufacturing method of the present embodiment, the external electrode end face portions 21 and 31 and the external electrode extended portions 42 and 52 are formed by the dipping method in which the body end faces 13 and 14 of the dielectric body 11 are dipped into a conductive paste. As another multilayer capacitor manufacturing method, the external electrodes 20 and 30 shown in FIG. 1 may be formed by separately printing the external electrode end face portions 21 and 31 and the external electrode extended portions 40 and 50. As a result, it becomes easier to make the dimension of the external electrode extended portions 40 and 50 in the extracting directions of the internal electrodes 17 and 18 larger than that of the external electrode extended portions 22 and 32.

Next, a mounting state of the multilayer capacitor 10 according to the present embodiment will be described.

Figure 9:
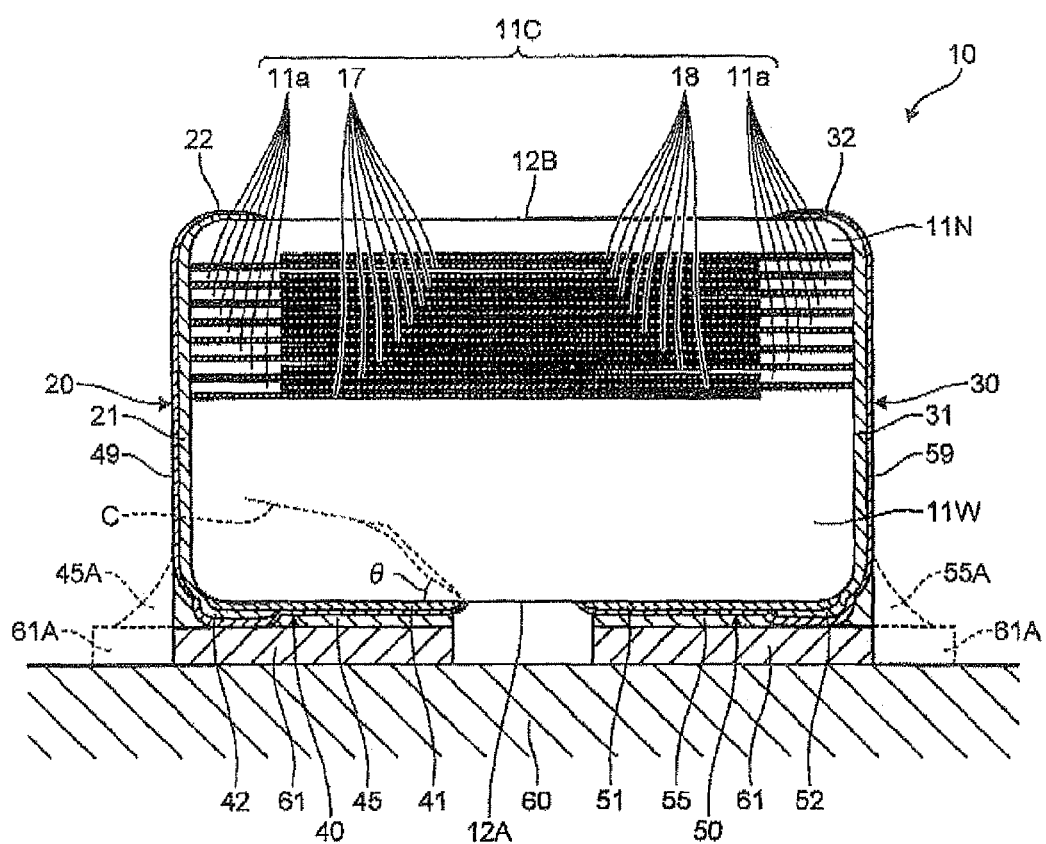
FIG. 9 is a side cross-sectional view showing a mounting state of the multilayer capacitor according to the embodiment of the present invention.

FIG. 9 is a aide cross-sectional view showing the mounting state of the multilayer capacitor according to the present embodiment. As shown in FIG. 9, the multilayer capacitor 10 is mounted on a circuit board (hereinafter, referred to as "substrate") 60. The substrate 60 is used in a small processing device such as a laptop personal computer, a PDA, or a mobile phone, for example. Substrate electrodes (lands) 61 are provided on a surface of the substrate 60 on which the multilayer capacitor 10 is mounted. Lines, which are not shown in the figure, are extended from the lands 61. The pair of external electrode extended portions 40 and 50 are soldered to the lands 61 by solders 45 and 55, respectively. In other words, the pair of external electrode extended portions 40 and 50 serve as bottom electrodes electrically connected to the substrate 60. Since the multilayer capacitor 10 has the bottom electrodes, alignment performance to the lands 61 can be improved.

If a force or a heat is applied to the substrate 60 itself, the substrate 60 is deformed. The deformation of the substrate 60 leads to the deformation of the multilayer capacitor 10. As a result, the multilayer capacitor 10 may receive a stress (external stress) from the substrate 60. The dielectric body 11 of the multilayer capacitor 10 is vulnerable to tension. If the dielectric body 11 is deformed in such a manner that the first body principal face 12A has a convex shape, a large tensile stress is generated in the first body principal face 12A. For example, if the external electrode extended portions 40 and 50 are short, when the substrate 60 is deflected, a tensile stress being applied to the tip portions of the external electrode extended portions 40 and 50 restrained by the substrate 60 becomes greater. As a result, there is a risk of generating a crack starting from the tip portions of the external electrode extended portions 40 and 50.

In the multilayer capacitor 10 of the present embodiment, the external electrode extended portions 40 and 50 reach up to a central region of the first body principal face 12A. Accordingly, when the substrate is deflected, it is possible to reduce an amount of deflection in the dielectric body 11 at the tip portions of the external electrode extended portions 40 and 50. Thus, it is possible to reduce a tensile stress applied to the tip portions of the external electrode extended portions 40 and 50. As a result, the generation of a crack can be suppressed. In other words, since the multilayer capacitor has the bottom electrodes longer than the external electrode extended portions 22 and 32, an external stress from the substrate 60 is reduced at the tip portions of the external electrode extended portions 40 and 50 as compared with a case where the bottom electrodes are short even when the deflection amount of the substrate 60 is the same for both cases. As a result, the multilayer capacitor 10 can suppress a risk of generating a crack C.

Moreover, since the portion other than the bottom electrodes is short in the multilayer capacitor 10, the entire external electrode area is reduced. Therefore, it is possible to reduce stress cracks caused by the external electrode layers (baked layers, plated layers) 20 and 30. Furthermore, since the multilayer capacitor 10 has the long bottom electrodes, solder connection between the bottom electrodes and the substrate 60 can be made reliably. As a result, the bonding strength between the multilayer capacitor 10 and the substrate 60 can be ensured.

As shown in FIG. 9, if the crack C is generated, the generation of the crack C starts from the edge of the external electrode extended portion 40 or 50 as described above. In the multilayer capacitor 10, the external electrode extended portions 40 and 50 reach up to the central region of the first body principal face 12A. As a result, an angle θ made by a direction in which the crack C grows and the first body principal face 12A becomes more acute. If the angle θ becomes smaller, a distance for the crack C to reach the internal electrodes 17 and 18 is increased. Thus, a risk that the crack C reaches up to the internal electrodes 17 and 18 is reduced.

Moreover, since the external electrode extended portions 40 and 50 reach up to the central region of the first body principal face 12A in the multilayer capacitor 10, a distance from the origin of the crack C to the external electrode 20 or 30 is increased. Thus, a risk that the crack C reaches the external electrode 20 or 30 is reduced.

Moreover, even if the crack C is generated in the dielectric layered product 11W of the multilayer capacitor 10, the crack C is less likely to reach the internal electrodes 17 and 18 due to the large thickness of the dielectric layered product 11W. As a result, it is possible to prevent a reduction in capacitance and a reduction in insulation resistance resulting from the crack C reached up to the internal electrodes 17 and 18.

As described above, a ferroelectric material is used for the dielectrics 11a in the multilayer capacitor 10. In a case where the multilayer capacitor 10 is mounted on the substrate 60 by directly connecting the external electrodes 20 and 30 to the lands 61, an electrostrictive phenomenon occurs in the dielectrics 11a when an alternating-current voltage is applied thereto from the external electrodes 20 and 30. Thus, the multilayer capacitor 10 is deformed. In other words, the electrostrictive phenomenon in the ceramic dielectrics 11a having ferroelectricity causes expansion and contraction distortion in the stacking direction of the multilayer capacitor 10. Then, in accordance with the typical dielectric Poisson's ratio (=0.3), expansion and contraction occur also in the direction perpendicular to the stacking direction, i.e., the direction parallel to the substrate surface of the substrate 60. If the multilayer capacitor 10 expands in the stacking direction, it contracts in the direction perpendicular to the stacking direction. If the multilayer capacitor 10 contracts in the stacking direction, it expands in the direction perpendicular to the stacking direction. If an alternating-current voltage is applied to the multilayer capacitor 10, the multilayer capacitor 10 repeatedly undergoes expansion and contraction in the stacking direction and expansion and contraction in the direction perpendicular to the stacking direction (phase thereof is shifted from that during the expansion and contraction in the stacking direction). As a result, the substrate 60 on which the multilayer capacitor 10 is mounted vibrates in the direction generally perpendicular to the substrate surface. The amplitude of the vibration of the multilayer capacitor 10 is minute (about 1 pm to 1 nm), and the vibration as it is can be hardly recognized as a sound for humans. However, when the multilayer capacitor 10 is mounted on the substrate 60, the substrate 60 serves as an acoustic impedance converter. Then, when a frequency of the vibration becomes an audible frequency range for humans (20 Hz to 20 kHz), it is detected as a sound for human ears. In this way, if the multilayer capacitor 10 is mounted on the substrate 60, squealing resulting from the electrostrictive phenomenon of the dielectric material may occur.

In the multilayer capacitor 10, the internal electrode layered product 11C is mounted on the substrate 60 via the dielectric layered product 11W. Thus, in the multilayer capacitor 10, the internal electrodes 17 and 18 are disposed concentrated at an upper part (the second body principal face 12B side) of the dielectric body 11. In the multilayer capacitor 10, the thickness of the dielectric from the internal electrodes 17 and 18 to the external electrode extended portions 40 and 50 as the bottom electrodes is large. Thus, the dielectric layered product 11W reduces distortion. In other words, distortion due to the electrostrictive phenomenon of the internal electrode layered product 11C transmitted to the substrate 60 is suppressed by the dielectric layered product 11W. As a result, according to the multilayer capacitor 10, the above-described distortion is less likely to be transmitted to the substrate 60, thereby being able to reduce squealing due to the electrostrictive vibration of the capacitor.

Lands 61A shown in FIG. 9 are disposed with end faces thereof on the sides of the external electrode end face portions 21 and 31 being at positions outer than the end faces of the external electrodes 20 and 30. Solder fillet portions 45A and 55A are thereby formed between the lands 61A and the external electrodes 20 and 30. As a result, the bonding strength between the lands 61A and the external electrodes 20 and 30 can be ensured. In a case where an electronic component is mounted on the substrate 60, such lands 61A are typically used.

As described above, in the multilayer capacitor 10, the external electrode extended portions 40 and 50, which are the bottom electrodes, reach up to the central region of the first body principal face 12A. Thus, as in the lands 61, the bonding strength between the external electrodes 20 and 30 and the lands 61 can be ensured without extending the multilayer capacitor 10 on the external electrode end face portions 21 and 31 sides to be outer than the external electrode end face portions 21 and 31. Thus, on the substrate 60 on which the multilayer capacitor 10 is mounted, mounting can be performed so that the end faces of the lands 61 on the sides of the external electrode end face portions 21 and 31 and the end faces of the external electrodes 20 and 30 are flush to each other. By employing the mounting structure in which the multilayer capacitor 10 is mounted on such lands 61, the multilayer capacitor 10 can suppress the solder fillet portions 45A and 55A. As a result, a package density on the substrate 60 can be improved. Moreover, the solder fillet portions 45A and 55A may be a cause of generating the above-described squealing. By reducing the fillet portions 45A and 55A, the multilayer capacitor 10 can also reduce the squealing. Moreover, owing to the reduction of the fillet portions 45A and 55A, the package density of the multilayer capacitor 10 can be improved.

The external electrode extended portions 40 and 50 serve as a mark for determining the mounting direction when mounted on the substrate 60. In other words, when the multilayer capacitor 10 is mounted on the substrate 60, it is only necessary that the external electrode extended portions 40 and 50 face the lands 61. A mounter for mounting the multilayer capacitor 10 to the substrate 60 conducts the image processing of an image obtained by imaging the multilayer capacitor 10, for example, so as to determine the external electrode extended portions 40 and 50 of the multilayer capacitor 10. Thus, the multilayer capacitor 10 can be mounted on the lands 61 of the substrate 60.

(Second Embodiment)

Figure 10:
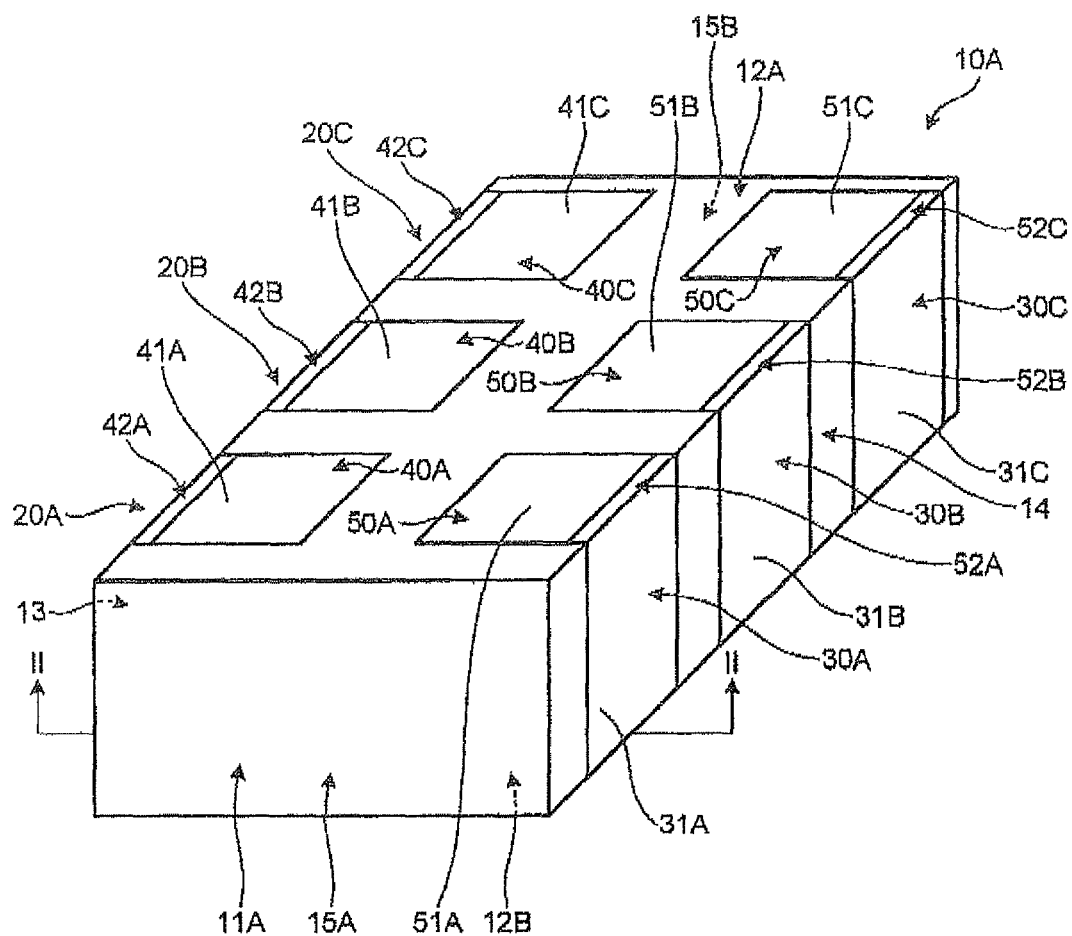
FIG. 10 is a perspective view showing a multilayer capacitor array according to an embodiment of the present invention.
Figure 11:
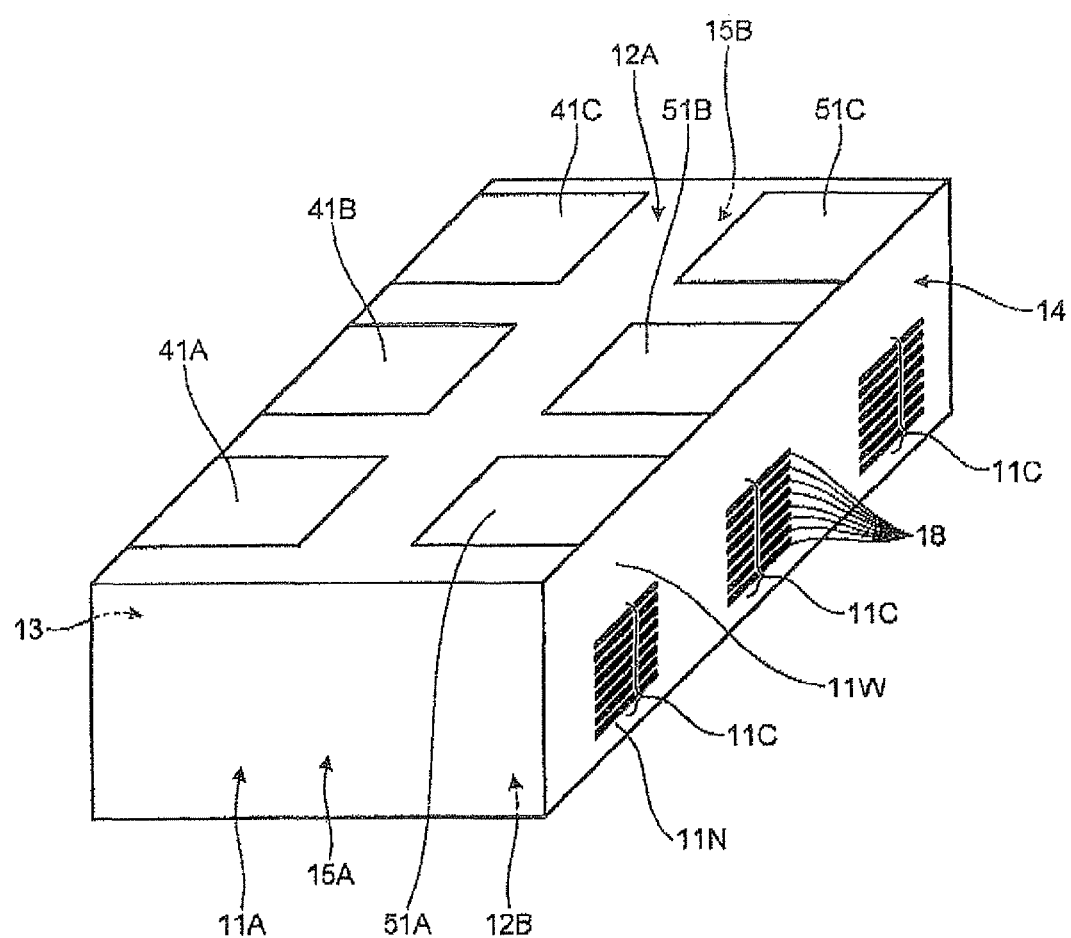
FIG. 11 is a perspective view showing an example of a dielectric body in the multilayer capacitor array according to the embodiment of the present invention.

FIG. 10 is a perspective view showing a multilayer capacitor array according to the present embodiment. FIG. 11 is a perspective view showing an example of a dielectric body in the multilayer capacitor array according to the present embodiment. A multilayer capacitor array 10A according to the present embodiment is a multilayer capacitor including a plurality of internal electrode layered products 11C each interposed between a pair of the first dielectric layered product 11W and the second dielectric layered product 11N. In the following description, components same as those described in the first embodiment will be denoted by the same reference numerals, and a redundant description will be omitted.

For example, the multilayer capacitor array 10A includes three multilayer capacitors. The multilayer capacitors included in the multilayer capacitor array 10A each include external electrodes 20A and 30A, external electrodes 20B and 30B, and external electrodes 20C and 30C formed at least on the first body end face 13 and the second body end face 14.

External electrode extended portions 40A and 50A, external electrode extended portions 40B and 50B, and external electrode extended portions 40C and 50C are formed on the first body principal face 12A shown in FIG. 10. In the external electrode extended portions 40A and 50A, conductive portions 41A and 51A, an external electrode extended portion 52A, which is extended from an end face 31A of the external electrode 30A and overlapped with the conductive portion 51A are formed on the first body principal face 12A. In addition, an external electrode extended portion 42A, which is extended from an end face of the external electrode 20A and overlapped with the conductive portion 41A, is formed on the first body principal face 12A. Similarly, conductive portions 41B, 51B, 41C, and 510 and external electrode extended portions 42B, 52B, 42C, and 52C are formed on the first body principal face 12A. A cross-section taken along the line II-II in FIG. 10 is similar to the cross-section of the multilayer capacitor 10 in FIG. 2.

As shown in FIG. 11, the multilayer capacitor array 10A includes the plurality of internal electrode layered products 11C each interposed between the first dielectric layered product 11W and the second dielectric layered product 11N. Moreover, the end faces 31A, 318, and 31C of the external electrodes 30A, 30B, and 30C shown in FIG. 10 cover the plurality of internal electrode layered products 11C, respectively, to achieve electrical connection therebetween. The same applies to the end faces of the external electrodes 20A, 20B, and 20C.

The first external electrodes 20A, 20B, and 20C and the second external electrodes 30A, 30B, and 30C are connected to the first internal electrodes 17 and the second internal electrodes 18, respectively, and include the external electrode extended portions 40A, 50A, 40B, 50B, 40C, and 50C extended only to the first body principal face 12A from the first body end face 13 and the second body end face 14. The first external electrodes 20A, 20B, and 200 and the second external electrodes 30A, 30B, and 30C may include portions extended to the second body principal face 12B which is opposite to the first body principal face 12A with a dielectric body 11A interposed therebetween. In such a case, the dimension of the external electrode extended portions 40A and 50A in the extracting directions of the first internal electrode 17 and the second internal electrode 18 is larger than the portions extended on the second body principal face 12B.

The first external electrodes 20A, 20B, and 20C and the second external electrodes 30A, 30B, and 30C serve as bottom electrodes electrically connected to the substrate 60. Since the multilayer capacitor 10A has the bottom electrodes, alignment performance to the lands 61 can be improved. Since the bottom electrodes are long, an external stress from the substrate 60 is reduced as compared with a case where the bottom electrodes are short even when the deflection amount of the substrate 60 is the same for both cases. Thus, it is possible to suppress the risk of generating a crack in the multilayer capacitor 10A. Since a portion other than the bottom electrodes is short, the entire external electrode area is reduced. Thus, it is possible to reduce stress cracks due to the external electrode layers (baked layers, plated layers) 20A, 20B, 20C, 30A, 30B, and 30C. Moreover, since the bottom electrodes are long, solder connection with the substrate 60 can be performed reliably. As a result, the bonding strength between the multilayer capacitor 10A and the substrate 60 can be ensured.

Even if a crack is generated, since the external electrode extended portions 40A, 40B, 40C, 50A, 50B, and 50C reach up to the central region of the first body principal face 12A, the crack is likely to occur with a more acute angle from the tip portions of the external electrode extended portions 40A, 40B, 40C, 50A, 50B, and 50C (the tip portions of the conductive portions 41A, 41B, 41C, 51A, 51B, and 51C). Thus, the risk that the crack reaches up to the internal electrodes 17 and 18, the first external electrodes 20A, 20B, and 20C, or the second external electrodes 30A, 30B, and 30C is reduced.

As described above, the multilayer capacitor array 101 is the array including the plurality of internal electrode layered products 11C. When connected to the substrate 60, the internal electrode layered products 11C serve as a plurality of multilayer capacitors. As a result, the multilayer capacitor array 10A of the present embodiment can enhance the function of the multilayer capacitor. Moreover, the multilayer capacitor array 10A has advantageous effects similar to those in the above-described multilayer capacitor 10.

As described above, in the present embodiment, the multilayer capacitor has been used for description as an element of an electronic component. Other applicable electronic components include an inductor, a filter, and a varistor having a dielectric body, or a composite type ceramic electronic component obtained by combining these elements.

According to the embodiments the present invention, it is possible to provide a multilayer capacitor capable of suppressing cracks and a method for manufacturing the multilayer capacitor.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multilayer capacitor comprising:
   a dielectric body; and
   a first external electrode and a second external electrode formed on the dielectric body,
   the dielectric body including:
   an internal electrode layered product in which a first internal electrode and a second internal electrode being opposite to each other are stacked via a dielectric therebetween;
   a first dielectric layered product and a second dielectric layered product interposing the internal electrode layered product from both sides thereof in a stacking direction;
   a first body principal face and a second body principal face being opposite to each other in the stacking direction;
   a first body lateral face and a second body lateral face being opposite to each other and connecting between the first body principal face and the second body principal face; and
   a first body end face and a second body end face from which the first internal electrode and the second internal electrode are extracted in respectively opposite directions, wherein the first dielectric layered product including the first body principal face is formed to be thicker than the second dielectric layered product including the second body principal face in the stacking direction and wherein:
   the first external electrode and the second external electrode are formed at least on the first body end face and the second body end face and connected to the first internal electrode and the second internal electrode, respectively and extend only to the first body principal face from the first body end face and the second body end face, or the first external electrode and the second external electrode extend at least to the first body principal face from the first body end face and the second body end face and extend also to at least one of the second body principal face, the first body lateral face, and the second body lateral face,
   a length of each of portions extended to the first body principal face is larger than a length of the portions extended to at least one of the second body principal face, the first body lateral face, and the second body lateral face, in a direction in which the first body end face and the second body end face are opposed,
   each of the portions extended to the first body principal face contains ceramic powder, and
   a portion formed on the first body end face and a portion formed on the second body end face contains less ceramic powder than each of the portions extended to the first body principal face, or the portion formed on the first body end face and the portion formed on the second body end face contains no ceramic powder.

2. The multilayer capacitor according to claim 1, wherein two or more internal electrode layered products interposed between the first dielectric layered product and the second dielectric layered product are provided.

3. A multilayer capacitor comprising:
   a dielectric body; and
   a first external electrode and a second external electrode formed on the dielectric body,
   the dielectric body including:
   an internal electrode layered product in which a first internal electrode and a second internal electrode being opposite to each other are stacked via a dielectric therebetween;
   a first dielectric layered product and a second dielectric layered product interposing the internal electrode layered product from both sides thereof in a stacking direction;
   a first body principal face and a second body principal face opposite to each other in the stacking direction;
   a first body lateral face and a second body lateral face opposite to each other and connecting between the first body principal face and the second body principal face; and
   a first body end face and a second body end face from which the first internal electrode and the second internal electrode are extracted in respectively opposite directions,
   wherein:
   the first dielectric layered product including the first body principal face is formed to be thicker than the second dielectric layered product including the second body principal face in the stacking direction,
   the first external electrode and the second external electrode are formed at least on the first body end face and the second body end face and connected to the first internal electrode and the second internal electrode, respectively,
   the first external electrode and the second external electrode include:
   a first external electrode extended portion and a second external electrode extended portion extended to the first body principal face from the first body end face and the second body end face, respectively; and
   a first conductive portion and a second conductive portion that are conductors extended to the first body principal face in an opposing direction in which the first body end face and the second body end face are opposed respectively from end portions in the opposing direction of the first body principal face, the first conductive portion and the second conductive portion are not extended to the first body end face and the second body end face, respectively, wherein:
the first external electrode extended portion and the second external electrode extended portion are connected to the first conductive portion and the second conductive portion while being overlapped with respective portions of the first conductive portion and the second conductive portion in the stacking direction at positions respectively closer to the first body end face and the second body end face, a part of the first conductive portion is exposed from the first external electrode extended portions and a part of the second conductive portion is exposed from the second external electrode extended portion, the first conductive portion has a first end adjacent to the first body end face that is disposed on a first curved portion formed at a ridge line between the first body end face and the first body principal face, and the second conductive portion has a second end adjacent to the second body end face that is disposed on a second curved portion formed at a ridge line between the second body end face and the first body principal face.

4. The multilayer capacitor according to claim 3, wherein the first conductive portion and the second conductive portion are formed by baked layers obtained by burning a conductive paste.

5. The multilayer capacitor according to claim 3, wherein the first conductive portion and the second conductive portion are formed with a material same as that of the first internal electrode and the second internal electrode.

6. The multilayer capacitor according to claim 3, wherein the first conductive portion, the second conductive portion, the first external electrode extended portion, and the second external electrode extended portion are covered with a conductive metal plating.

7. The multilayer capacitor according to claim 6, wherein the portions of the first external electrode and the second external electrode at the first body end face and the second body end face contain less ceramic powders than the first conductive portion and the second conductive portion or contain no ceramic powders.

8. The multilayer capacitor according to claim 3, wherein the first conductive portion and the second conductive portion contain ceramic powders.

9. A method for manufacturing a multilayer capacitor, comprising:
interposing an internal electrode layered product in which a first internal electrode and a second internal electrode opposite to each other are stacked via a dielectric between a first dielectric layered product and a second dielectric layered product from both sides thereof in a stacking direction and forming a dielectric body in such a manner that the first dielectric layered product is thicker than the second dielectric layered product in the stacking direction; and first forming a first external electrode and a second external electrode respectively extended from a first body end face and a second body end face from which the first internal electrode and the second internal electrode are extracted in respectively opposite directions to portions of a first body principal face that is a surface of the first dielectric layered product in the stacking direction and connects between the first body end face and the second body end face, wherein:
the dielectric body includes: a second body principal face opposite to the first body principal face in the stacking direction; and a first body lateral face and a second body lateral face opposite to each other and connecting between the first body principal face and the second body principal face, and the first external electrode and the second external electrode extend at least to the first body principal face from the first body end face and the second body end face and extend also to at least one of the second body principal face, the first body lateral face and the second body lateral face, a length of each of portions extended to the first body principal face is larger than a length of the portions extended to at least one of the second body principal face, the first body lateral face, and the second body lateral face, in a direction in which the first body end face and the second body end face are opposed, each of the portions extended to the first body principal face contains ceramic powder, and a portion formed on the first body end face and a portion formed on the second body end face contains less ceramic powder than each of the portions extended to the first body principal face, or the portion formed on the first body end face and the portion formed on the second body end face contains no ceramic powder.

10. The method for manufacturing a multilayer capacitor according to claim 9, wherein the first external electrode and the second external electrode are formed with a conductive paste.

11. A method for manufacturing a multilayer capacitor comprising:
interposing an internal electrode layered product in which a first internal electrode and a second internal electrode opposite to each other are stacked via dielectric between a first dielectric layered product and a second dielectric layered product from both sides thereof in a stacking direction and forming a dielectric body in such a manner that the first dielectric layered product is thicker than the second dielectric layered product in the stacking direction;

first forming a first external electrode and a second external electrode respectively extended from a first body end face and a second body end face from which the first internal electrode and the second internal electrode are extracted in respectively opposite directions to portions of a first body principal face that is a surface of the first dielectric layered product in the stacking direction and connects between the first body end face and the second body end face; and second forming a first conductive portion and a second conductive portion electrically isolated from each other on the first body principal face, wherein the first forming includes: after the second forming, forming a first external electrode extended portion and a second external electrode extended portion respectively extended from the first body end face and the second body end face so as to be overlapped with only respective portions of the first conductive portion and the second conductive portion; and connecting the first external electrode extended portion and the second external electrode extended portion with the first conductive portion and the second conductive portion.

12. The method for manufacturing a multilayer capacitor according to claim 11, wherein
the dielectric body includes: a second body principal face opposite to the first body principal face in the stacking direction; and a first body lateral face and a second body lateral face opposite to each other and connecting between the first body principal face and the second body principal face, and
the first external electrode and the second external electrode include portions respectively extended to at least one of the second body principal face, the first body lateral face, and the second body lateral face, and a dimension of the first conductive portion and the second conductive portion in the extracting directions of the first internal electrode and the second internal electrode is formed to be larger than that of the portions extended to at least one of the second body principal face, the first body lateral face, and the second body lateral face.

13. The method for manufacturing a multilayer capacitor according to claim 11, further comprising a burning step of heating the dielectric body after the conductive portion forming step.

14. The method for manufacturing a multilayer capacitor according to claim 13, wherein the first conductive portion and the second conductive portion contain ceramic powders.

15. The method for manufacturing a multilayer capacitor according to claim 13, wherein portions of the first external electrode and the second external electrode at the first body end face and the second body end face contain less ceramic powders than the first conductive portion and the second conductive portion or contain no ceramic powders.

16. The method of manufacturing a multilayer capacitor according to claim 11, wherein the first external electrode and the second external electrode are formed with a conductive paste.

\* \* \* \* \*